C. D. CURRY.
AUTOMATIC POWER CONTROLLER.
APPLICATION FILED JAN. 15, 1916.

1,234,295.

Patented July 24, 1917.
2 SHEETS—SHEET 1.

Inventor
Claud D Curry
By his Attorney

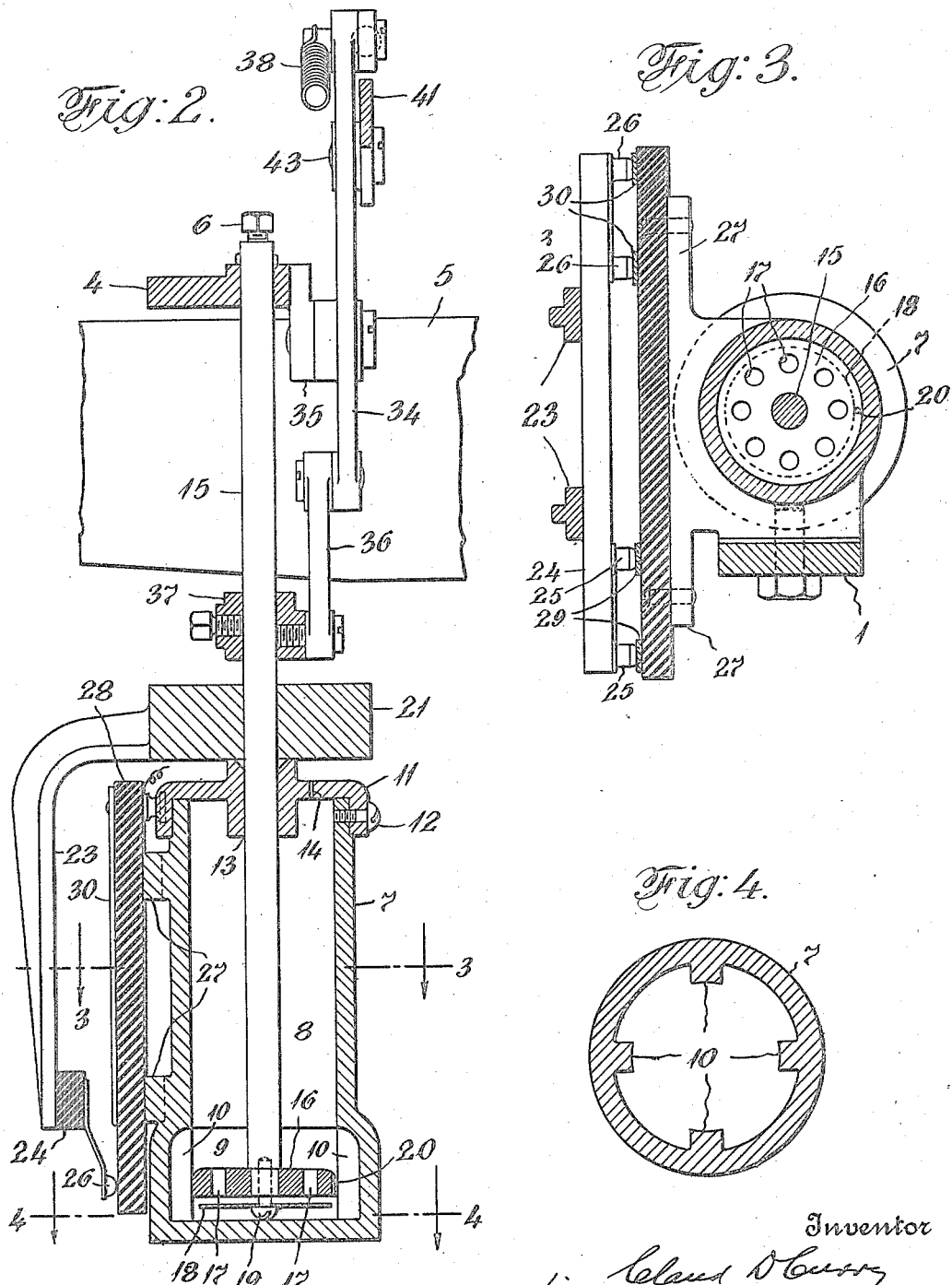

UNITED STATES PATENT OFFICE.

CLAUD D. CURRY, OF BROOKLYN, NEW YORK.

AUTOMATIC POWER-CONTROLLER.

1,234,295.

Specification of Letters Patent.   Patented July 24, 1917.

Application filed January 15, 1916.   Serial No. 72,209.

*To all whom it may concern:*

Be it known that I, CLAUD D. CURRY, a citizen of the United States, and a resident of borough of Brooklyn, in the county of Kings and State of New York, have invented certain new and useful Improvements in Automatic Power-Controllers, of which the following is a specification.

This invention relates to power controlling devices and in particular to means for automatically cutting off the supply of power to the machine after the completion of a cycle of operations thereon.

In devices of this general character heretofore in use, the power has been cut off simultaneously with the operator's leaving his place at the machine which often resulted in suspending the action of the mechanism in the midst of a cycle of operation. Accordingly before a workman could, for instance, attend to any repairing or adjusting which the machine required, it was necessary to first start up the motor to finish the cycle of operation and restore the mechanism to normal condition. An object of this invention, therefore, is to prevent the wasting of power by providing means for cutting off the supply of power to a machine a predetermined interval of time after the operator has ceased manipulating the means for controlling the machine in order to allow sufficient time for the completion of any given operation.

Another feature of the invention is the provision of a signal that will indicate at a distance, or on the machine itself, or in both situations, whether or not power is being supplied to the machine.

In constructing the device a set of movable contacts is arranged to be acted on by gravity to move to circuit breaking position with relation to a set of stationary contacts. Retarding means, on which the movable contacts are carried, are provided which take the form of a piston working in a cylinder filled with oil, or an equivalent liquid. Large openings, controlled by a valve, allow the piston to be rigidly moved from one end of the cylinder to the other in one direction, but the movement of the piston in the opposite direction to carry the contacts to circuit breaking position is restrained by the provision of restricted openings by which the liquid can pass from one side of the piston to the other.

When in circuit closing position the movable contacts are constantly moving toward circuit breaking position. In order to prevent the automatic cutting off of the supply of power to the machine, a connection between the piston and a manually controlled operating part, such for instance as the slug ejecting lever in a linotype machine which may also be referred to as a means for controlling the operations performed by the machine, is provided by means of which the piston and the contacts carried thereby are reset away from circuit breaking position with each movement of the manually controlled operating part. If this operating part has not been actuated within the predetermined interval for which the machine has been adjusted, the power supply to the machine will be cut off and the corresponding signal given.

Other features of construction will appear as the specification proceeds.

In the accompanying drawings in which the reference characters designate corresponding parts:

Fig. 2 is a vertical section taken along line 2—2 of Fig. 1 looking in the direction of the arrows.

Fig. 3 is a cross-section taken along the line 3—3 of Fig. 2.

Fig. 4 is a cross-section taken along the line 4—4 of Fig. 2.

Figure 1:
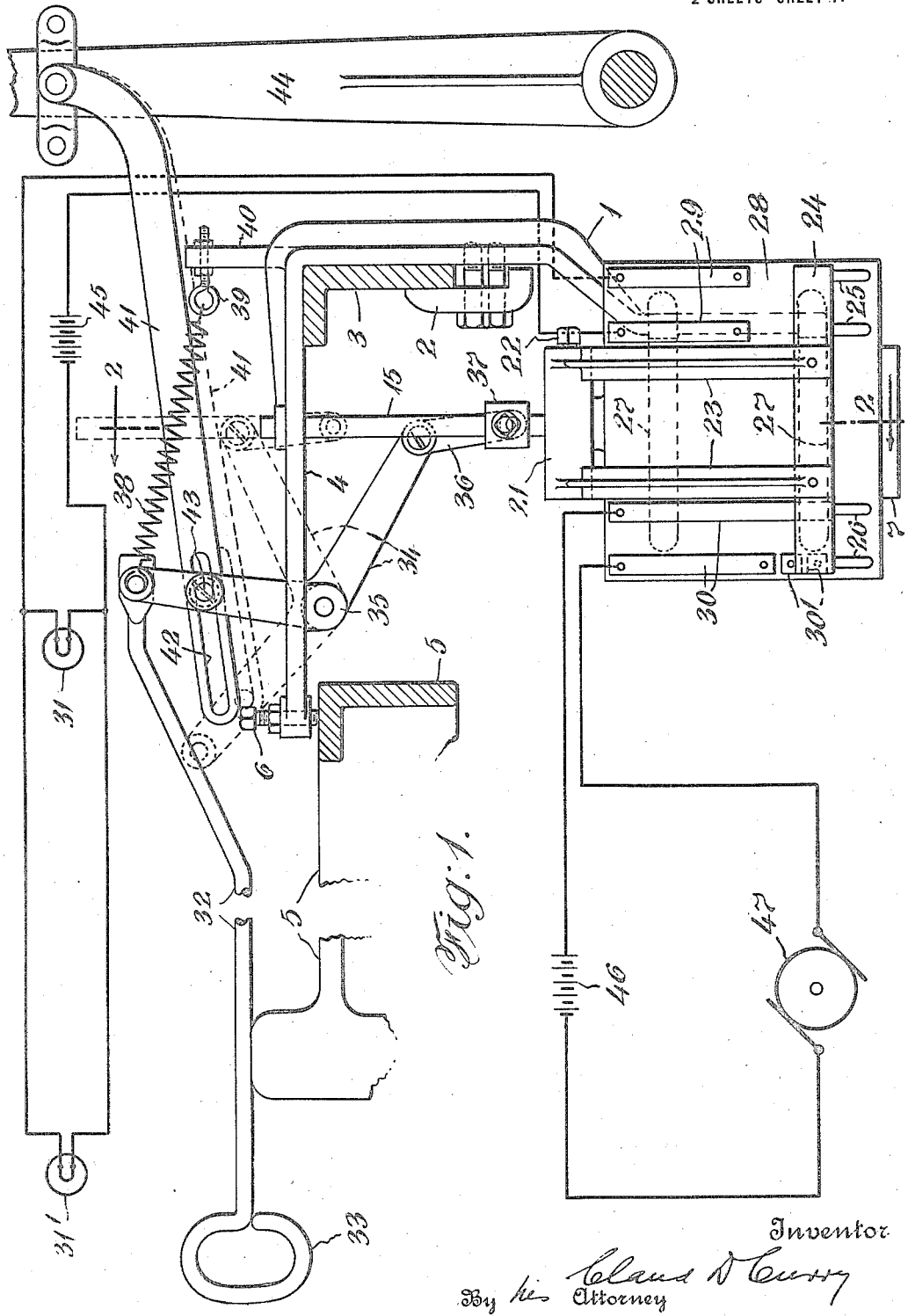
Figure 1 is a view partly in elevation and partly in section of the device showing the motor and the lamp circuits in diagrammatic form.

In the drawings the numeral 1 designates a supporting bracket provided with means, such as the clamping member 2, for securing the bracket to a frame member 3 of a linotype. A horizontal extension 4 of the bracket projects to a position above a second frame piece 5. A screw 6 tapped into the end of the arm bears against the frame piece 5 and provides a means for adjusting the level of the bracket and the parts carried thereby.

Supported by the bracket 1 is the cylinder 7, provided for the greater part of its length with the bore 8 but having a bore of enlarged diameter 9 with inwardly projecting guide flanges 10 at the lower end. A cap 11 is adapted to be secured to the upper end of the cylinder by means of the screw 12 to close the end thereof. The cap is provided at its center with the bore 13 for the passage of a piston stem and with a small air port 14.

A valve stem 15 arranged to slide through the bore 13 in the cylinder cap, carries the piston 16 which travels in the cylinder 7. The cylinder is adapted to be filled with oil and the piston 16 is provided with the relatively large openings 17 through which the volume of oil in the cylinder can quickly pass so that the piston can rapidly ascend from the bottom to the top of the cylinder. To provide for a slow travel of the piston from the top to the bottom of the cylinder the openings 17 are adapted to be closed when the piston moves in this direction by the valve member 18 which is loosely supported just beneath the openings, or ports, 17 on a screw 19 mounted in the end of the valve stem 15. In this direction of travel of the piston the liquid is forced to pass through the small bore 20 in the piston or through the narrow annular space that may be provided between the piston and the inner wall of the cylinder.

It is obvious that because of the restricted size of the passage by which the liquid in the cylinder must pass from one side of the piston to the other, the movement of the cylinder to the piston from the top of the cylinder to the lower end of the bore 8 will necessarily require a comparatively long interval of time. However, when the piston has passed from the bore 8 into the large bore, the liquid rushes around the periphery of the piston between the guide flanges 10 and permits a rapid descent of the piston through the remaining portion of the path of travel thereof.

A weight 21, attached to the valve stem 15 by means of the set screw 22, constantly exerts a pressure tending to move the piston to a position at the bottom of the cylinder.

Integral with the weighted member 21 are the bracket arms 23 which project outwardly from the weighted member and then downwardly, and carry at their lower extremities a cross bar 24 adapted to serve as a support for two sets of contact members 25 and 26.

Rigidly attached to the lugs 27 formed on the cylinder is the contact supporting plate 28 carrying the two sets of contacts 29 and 30. The contacts 29 are adapted to be bridged by the corresponding contacts 25 on the cross bar 24 throughout the greater portion of the travel of the contacts 25 to control a signal such as lamps indicated at 31 and 31' connected to the source of current indicated at 45. The contacts 26 coöperate with the contacts 30 to control the circuit which supplies power from the source 46 to the motor 47 which drives the machine. One of the contact members 26 is preferably divided into sections as shown at 30' to which are connected resistances varying in value and adapted to be made use of in starting the motor.

It will be noted that in the downward movement of the contacts the signal circuit is broken before the circuit through the motor is broken. The purpose of this is to indicate to the operator that the supply of power is about to be cut off from the motor and that it will be necessary for him to proceed with his work to prevent the shutting off of the supply of power to his machine.

In order to lift the piston and the contacts carried thereby into circuit closing position in order to start the motor, an arm 32 sliding on the framepiece 5 and provided with a handle 33 is pivotally connected to the bell crank 34 which is in turn pivoted in a lug 35 on the horizontal extension of the bracket 1. The remaining end of the bell crank is connected through the link 36 to a set collar 37 mounted on the valve stem 15. This set collar is adapted to be adjusted in position on the stem 15 for the purpose of varying the height to which the piston can be raised and thus governing the time required for the circuit breaker to act.

An additional means for governing the time interval as well as for assisting in the movement of the contacts toward circuit breaking position is furnished by the contraction spring 38 which is connected to the upper end of the bell crank 34 at one end and to an adjusting screw 39, which is mounted in an upstanding lug 40 on the bracket 1, at the other. It will be obvious that the pull of the spring on the bell crank 34 can be varied by turning the adjusting screw 39 and that the speed of travel of the piston 16 can thus be regulated.

In addition to the handle 33 which is made use of in the initial starting of the motor, a device is provided that will at intervals reset the piston and contacts to their uppermost position during the normal operation of the machine. This device takes the form of a link 41 which is connected through a slot 42 with a pin 43 on the bell crank 34. The other end of this link is pivotally connected to a lever 44 which in this instance is the slug ejecting lever of a linotype machine. This lever is adapted to be manually operated with the completion of each type casting operation, and the movement of the lever to the left in Fig. 1 of the drawing in performing the type slug ejecting operation, will through the engagement of the link 41 with the bell crank 34, also act to raise the piston and movable contacts away from circuit breaking position.

Thus it will be seen that in the operation of the linotype machine the circuit breaker will be at intervals corresponding to the type casting operations reset away from circuit breaking position. These intervals will ordinarily be of such a length that in the normal operation of the machine the resetting act will take place before the contacts have reached circuit breaking position and it is only upon the suspension of operations for a comparatively long interval, for instance three or four minutes, that the circuit would be broken by the descent of the slow acting switch to circuit breaking position.

The purpose of providing an interval of this length after the operation of the slug ejecting lever is to insure that the distributing mechanism will have time to complete an operation so that, should the operator leave his keyboard immediately after the slug ejecting lever has acted, the machine will continue to have power supplied to it until the distribution of the matrices has been completed.

The lamp 31ᵃ may be one of a series of lamps in a superintendent's office which correspond to a number of machines. It will be obvious that the indication offered by the lamps may be of assistance in the supervision of a number of machines and that this would tend toward a generally increased efficiency in the work.

It will be obvious that the purpose of having the piston move quickly as it approaches the lower end of the cylinder is to provide for a sudden separation of the contacts in the motor circuit to thereby lessen the tendency for the current to form an arc at the point of rupture.

It is to be understood that the reference to a linotype machine is merely as an example and that the power controlling device illustrated and described is adapted to be used in connection generally with power-driven machines which are constructed to have their operations controlled manually or otherwise.

What is claimed, is:

1. A power controlling device comprising: a machine, means manually operable at intervals for controlling the operations performed by the machine, and means for automatically stopping the machine when one of said intervals exceeds a predetermined length of time.

2. A power controlling device comprising: a machine, a motor therefor, means manually operable at intervals for controlling the operations performed by the machine, and means for automatically cutting off the supply of power to the motor when said manually operable control means has not been actuated for a predetermined length of time.

3. In an apparatus of the character described, a machine, means for controlling the operations performed by the machine, means normally moving toward a position to disconnect the power supplied to the machine, and means actuated by the controlling means for resetting said power disconnecting means away from power disconnecting position.

4. A power controlling device comprising: a machine, means operable at intervals for controlling the operations performed by the machine, and means operating to cut off the supply of power to the machine when a predetermined interval of time has passed without an operation of the controlling means.

5. A power controlling device comprising: a machine arranged to be operated by power, means operable at intervals for manually controlling the operations performed by the machine, and means normally inoperative but operating to cut off the supply of power to the machine when a predetermined interval of time has passed without an operation of the manually controlled means.

6. In an apparatus of the character described, a machine, means for controlling the operations of the machine, means moving toward a position to disconnect the power supplied to the machine after a predetermined interval of time, and means actuated by said controlling means for resetting said moving means away from power disconnecting position each time an operation is performed whereby, if the operations are not performed at intervals less than the predetermined one, the power supply will be disconnected from the machine.

7. A power controlling device for a linotype-machine comprising: a motor, means operable at intervals for controlling the operations performed by the linotype-machine, and means for automatically cutting off the power supplied to the motor when a predetermined interval of time has passed without an operation of the controlling means.

8. A power controlling device for a linotype-machine comprising: a motor, means operable at intervals for controlling the operations performed by the linotype-machine, and timing means for automatically cutting off the power supplied to the motor when the operation of said controlling means has been delayed for a predetermined interval of time.

9. A power controlling device for a linotype-machine comprising: means for controlling the operations performed by the linotype-machine, means normally moving toward a position to cut off the supply of power to the linotype-machine, and means actuated by said controlling means for resetting said moving means away from power disconnecting position each time an operation is performed.

10. A power controlling device for a machine for casting type slugs comprising: a slug ejecting member, means normally moving toward a position to cut off the supply of power to the machine, and means actuated by the operation of the slug ejecting member for resetting said moving means away from power disconnecting position.

11. A power controlling device for a machine for casting type slugs comprising: a slug ejecting member, means normally moving toward a position to cut off the supply of power to the machine after a predetermined interval of time, and means operated by the slug ejecting member for resetting said moving means away from power disconnecting position whereby, if the slug ejecting member is not operated at intervals less than the predetermined one, the supply of power will be cut off from the machine.

12. A power controlling device comprising: a machine, a motor therefor, a signal, means operable at intervals for controlling the operations performed by the machine, and means for automatically cutting off the supply of power to the motor and for actuating said signal when a certain interval of time has passed without an operation of the controlling means.

13. A power controlling device comprising: a machine, a motor therefor, means tending to automatically cut off the supply of power to the motor at the end of each cycle of operation, and means for preventing the operation of said automatic means for an arbitrary number of cycles of operation at the will of the operator.

14. A power controlling device comprising: a machine, means manually operable at intervals for controlling the operations performed by the machine, a signal, and means for operating the signal when the frequency of operation of the manually operable control means falls below a certain predetermined value.

Signed at New York in the county of New York and State of New York this 14th day of January A. D. 1916.

CLAUD D. CURRY.

Witnesses:
RITA LYNCH,
TERESA V. LYNCH.